3,522,207
LIGHT STABILIZED POLYMERS CONTAINING
TETRACARBOXYLIC ACID ESTERS
Dieter H. A. Hayer, Stuttgart-Bad Cannstatt, and Lore Grozinger, Stuttgart-Feuerbach, Germany, assignors to G. Siegle & Co. G.m.b.H., Stuttgart, Germany
Continuation-in-part of application Ser. No. 435,512, Feb. 26, 1965. This application June 16, 1967, Ser. No. 646,508
Int. Cl. C08f 45/58; C08g 51/58
U.S. Cl. 260—45.85
9 Claims

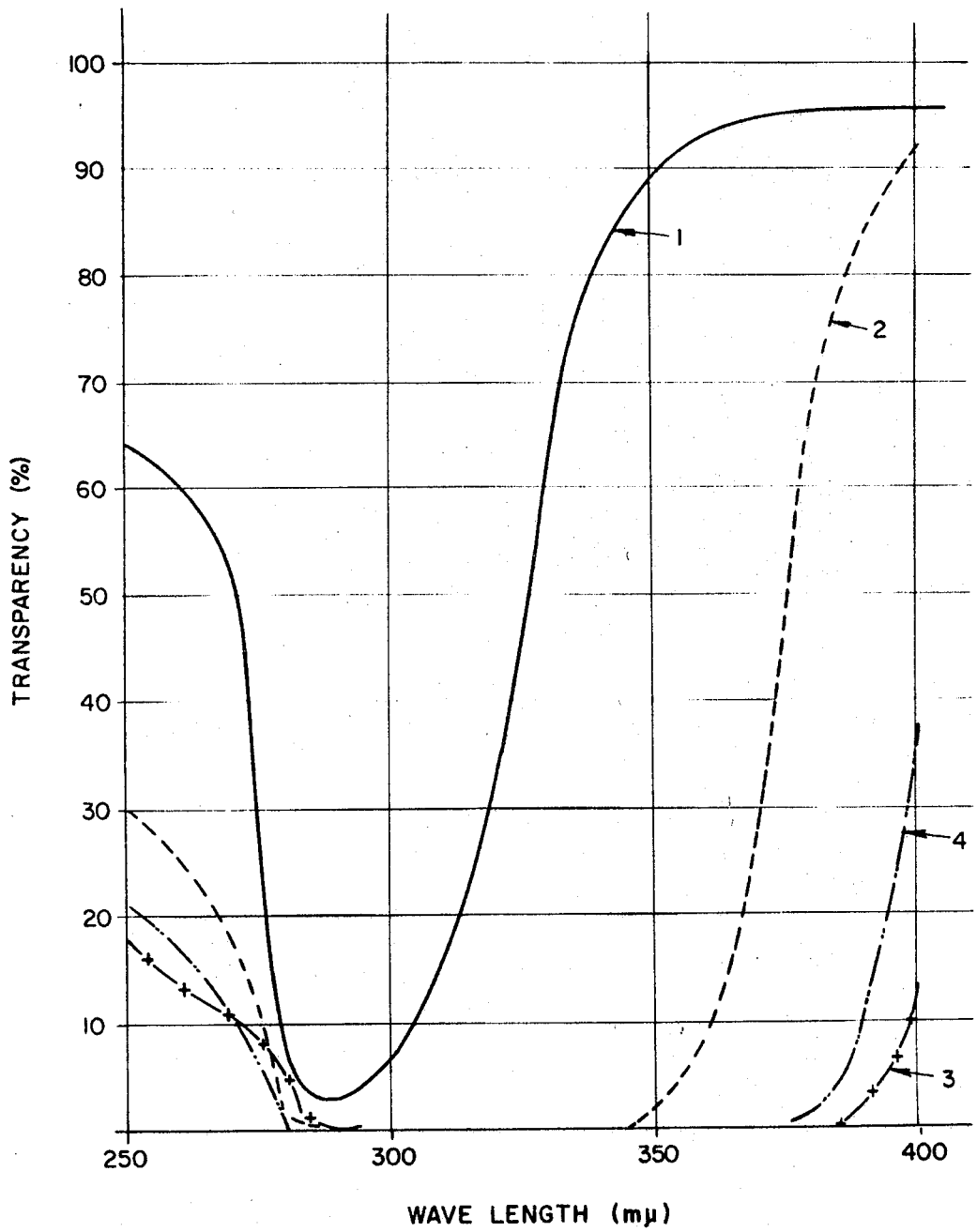

ABSTRACT OF THE DISCLOSURE

Compositions containing organic polymers are stabilized against the deleterious effects of ultraviolet light by incorporating therewith an ultraviolet light absorber which is selected from compounds having the following general formulae:

(I) 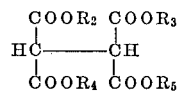

(II) 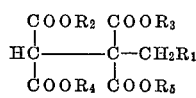

and (III) 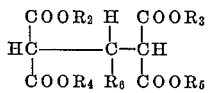

wherein $R_1$, $R_2$, $R_3$, $R_4$ and $R_5$ are monovalent substituents selected individually from the group consisting of alkyl, aryl, aralkyl, cycloalkyl, heterocyclic, and substituted alkyl, aryl, aralkyl, cycloalkyl and heterocyclic groups, and $R_6$ is a monovalent substituent selected from the group consisting of aryl, aralkyl, heterocyclic and substituted aryl, aralkyl and heterocyclic groups. The invention also provides a method of preparing the ultraviolet light stabilized polymer compositions of the invention.

---

This application is a continuation-in-part of our copending application Ser. No. 435,512, filed Feb. 26, 1965, for "Process and Composition Incorporating Ultra-Violet Light Stabilizers," now abandoned.

This invention broadly relates to the stabilization of organic materials against the deleterious effects of ultraviolet light. In one of its more specific variants, the invention is concerned with the stabilization of polymers by means of the ultraviolet light absorbers to be described more fully hereinafter.

Many compounds are known which are capable of absorbing ultraviolet light and are suitable for incorporation into compositions for the purpose of acting as stabilizers against ultraviolet light radiation. For example, compounds containing benzophenone and benzotriazole groups have been used for this purpose. However, many of the known stabilizers, in many applications, do not possess all of the desired characteristics for more general use.

It is an object of the present invention to provide improved organic materials which are stabilized against ultraviolet light decomposition, and a novel method for their preparation.

It is a further object to provide improved ultraviolet light stabilized polymer compositions, and a novel method of preparing the same.

Still other objects and advantages of the invention will be apparent to those skilled in the art upon reference to the following detailed description, the specific examples, and the drawing, which graphically illustrates the effectiveness of the compounds used in practicing the invention as ultraviolet light absorbers.

In accordance with this invention, certain polycarboxylic acid esters are found to be particularly suitable as ultraviolet light stabilizers. The esters are represented by the following structural formulae:

(I) 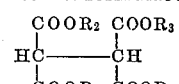

(II) 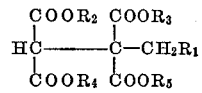

and (III) 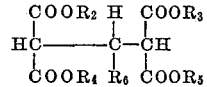

wherein $R_1$, $R_2$, $R_3$, $R_4$ and $R_5$ are monovalent substituents selected individually from the group consisting of alkyl, aryl, aralkyl, cycloalkyl, heterocyclic, and substituted alkyl, aryl, aralkyl, cycloalkyl and heterocyclic groups, and $R_6$ is a monovalent substituent selected from the group consisting of aryl, aralkyl, heterocyclic and substituted aryl, aralkyl and heterocyclic groups. $R_6$ in the above formulae must not be hydrogen as the resulting ultraviolet light absorbers are not effective.

The alkyl groups may contain about 1–20 and preferably about 1–8 carbon atoms, the aryl groups may contain about 6–18 and preferably about 6–10 carbon atoms, the aralkyl groups may contain about 7–25 and preferably about 7–15 carbon atoms, the cycloalkyl groups may contain about 4–20 and preferably about 5–7 carbon atoms, and the heterocyclic groups may contain about 3–10 and preferably about 4–6 carbon atoms and at least one different atom in the ring such as oxygen, sulfur or nitrogen. It is understood that the groups $R_1$–$R_6$ in the above formulae may all be the same or of differing significance. They may also be substituted and typical substituents, which are not in any sense limiting, may be halogen, hydroxyl, nitro, sulfo, amino, carboxymethyl, and carbamino groups.

The compounds represented by the above formulae may be produced from mono-functional alcohols or multi-functional hydroxy compounds. In accordance with the invention, the prepared compounds have the ability to condense and thus produce ring systems which also are ultraviolet light stabilizers in the same was as the non-condensed compounds.

The following are exemplary ultraviolet light absorbers of the invention which may be produced according to known procedures:

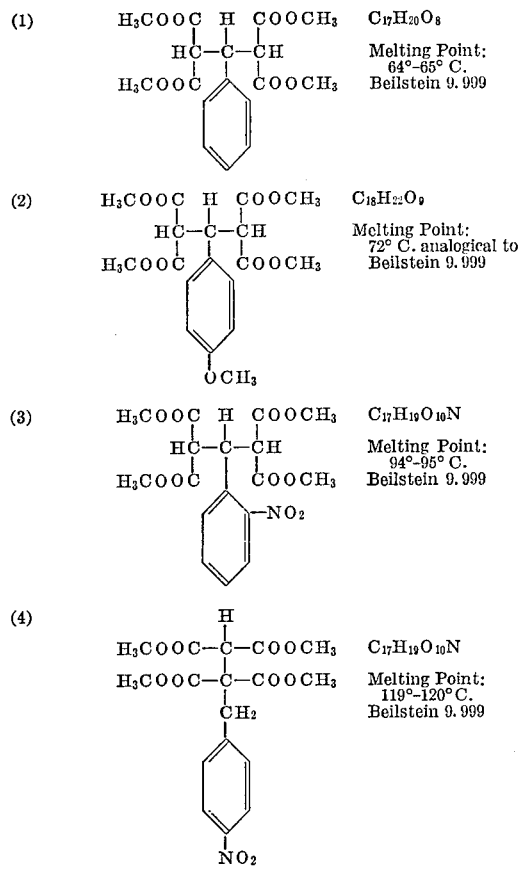

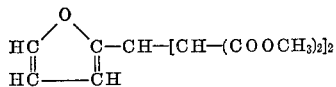

The accompanying drawing illustrates curves obtained with each of the above compounds identified as 1–4, when placed in concentrations of 0.025 m. in methanol and at 1 cm. thickness of the solution. The curves represent percentage of transparency plotted against wavelengths varying from 250 to 400 mμ. It can be seen that the compounds are excellent absorbers in the range indicated.

Other examples of specific ultraviolet light absorbers of the invention are the methyl or ethyl tetraesters of 1,1,2,2-ethanetetracarboxylic acid, $$C_6H_5—CH—[CH—(COOCH_3)_2]_2$$
$$CH_3O—C_6H_4—CH—[CH(COOCH_3)_2]_2$$
$$NO_2—C_6H_4—CH—[CH(COOCH_3)_2]_2$$
$$CH—(COOCH_3)_2—C—(COOCH_3)_2—CH_3$$
$$CH—(COOCH_3)_2—C—(COOCH_3)_2—C_2H_5$$
$$CH—(COOCH_3)_2—C—(COOCH_3)_2—C_4H_9$$
$$CH—(COOCH_3)_2—C—(COOCH_3)_2—CH_2—CH=CH_2$$
$$CH—(COOC_2H_5)_2—C—(COOC_2H_5)_2—CH_2—C_6H_5$$
$$CH—(COOCH_2C_6H_5)_2—C—(COOCH_3)_2—CH_2—C_6H_5$$
$$NO_2—C_6H_4—CH[CH(COOC_2H_5)_2]_2$$
$$C_3H_7—CH—[CH—(COOCH_3)_2]_2$$
$$C_6H_5—CH—[CH—(COOC_2H_5)_2]_2$$
$$(CH_3O)_2—C_6H_3—CH—[CH—(COOCH_3)_2]_2$$
$$C_6H_5—CH—[CH—(COOC_8H_{17})_2]_2$$
$$C_6H_5—CH—[CH—(COOCH_2—C_6H_5)_2]_2$$

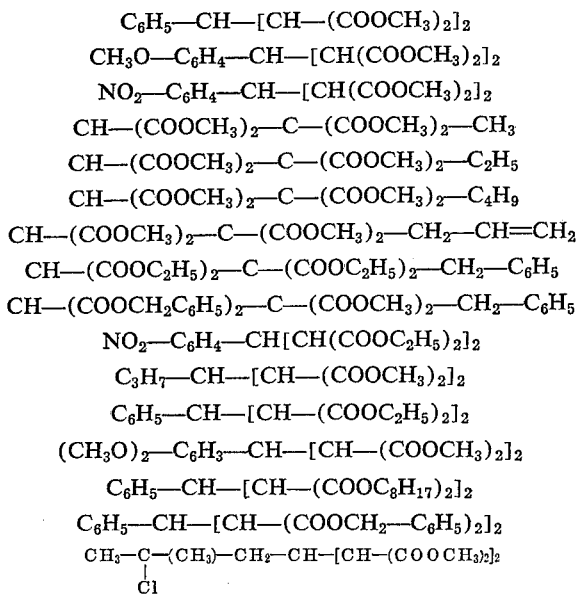

The stabilizer compounds of the invention absorb ultraviolet radiation in organic plastic and resinous materials in general, lacquers and other media, as well as in solvents. The stabilizer compounds of the invention are colorless and do not discolor when exposed to light. This property is especially advantageous for use in transparent resins as well as in colored resins, etc. The materials containing the compounds of the invention remain clear and colorless even after long exposure to ultraviolet radiation. Since the compounds of the invention may be varied by substituent groups, differences in physical properties (solubility, melting point, etc.) may be obtained and may be used to advantage wherein particular physical properties are desired for a particular use.

The stabilizer compounds of the invention possess good heat stability and this is an advantage where processing of the compounds in various applications requires the use of relatively high temperatures. Since the compounds are relatively stable, there is no discoloration of the stabilized material. The excellent chemical and physical compatibility properties of the stabilizers qualifies them for almost universal application in organic plastics and resins for stabilizing purposes. In addition, the stabilizers possess low odor characteristics.

It has been found that plastic and resinous materials stabilized with the stabilizers of this invention possess excellent stability against ultraviolet radiation, and show no effects of degradation, etc. In addition, it has been found that the stabilizers do not affect the viscosity of the materials. Plastic and resinous materials for example, normally susceptible to ultraviolet light decomposition and capable of being stabilized include polyesters, polyamides, acrylate resins, epoxy resins, varnishes, cellulosics, lacquers, homopolymers of halogenated vinyl compounds in general, interpolymers of halogenated vinyl compounds with other ethylenically unsaturated halogen-free monomers interpolymerizable therewith such as vinyl alcohol or vinyl acetate, interpolymers of two or more halogenated vinyl compounds such as vinyl chloride and vinylidene chloride, and polyolefins in general, including homopolymers or alpha monoolefins containing, for example, 2–10 carbon atoms, interpolymers of two or more of such alpha monoolefins, and interpolymers thereof with polyenes such as butadiene and other conjugated dienes. Specific examples of polymers which may be stabilized include polyvinyl chloride, copolymers of vinyl chloride and vinyl acetate, copolymers of vinyl chloride and vinylidene chloride, polystyrene, polybutylmethacrylate, polyethylene and polypropylene. The homopolymers and copolymers mentioned above are commercial products, and in instances where copolymers are stabilized, the chemically bound monomer contents thereof may be the same as in the commercially available products.

Another advantage of the stabilizer compounds of the invention is their low toxicity. This property would make them particularly useful in food packaging, ointments, liniments and oils for skin protection, etc.

Another important field of use is in printing inks wherein the compatibility of the ultraviolet light stabilizer is important due to the relatively high viscosity of the inks.

The amount of the stabilizer to be used varies with the particular stabilizer and the material to be stabilized. This can readily be determined in each case and normally a small or minor proportion of the stabilizer is used based on the material to be stabilized. Usually about 0.01–10 parts by weight and preferably about 0.1–5 parts by weight of the ultraviolet light absorber is admixed with each 100 parts by weight of the material to be stabilized, such as an organic polymer, or polymer composition. Best results are often obtained when about 0.3–2 parts by weight of the ultra-violet satbilizer is used for each 100 parts by weight of the organic polymer.

The ultraviolet light absorber may be admixed with the polymer or other material to be stabilized so as to be uniformly dispersed therein by any convenient prior art process, such as by means of calendering rools, roll mills in general, and other mixing devices. If desired, the stabilized polymers or polymer compositions thus produced may be further compounded and processed in accordance with prior art techniques and then formed into desired articles which are stabilized against decomposition due to ultraviolet light.

The ultraviolet light absorbers used in practicing the invention may be combined with, for example, 0.1–10 percent by weight of the material to be stabilized of other stabilizing agents which have been previously described in the literature. Specific examples of other stabilizing agents which may be used include commercial barium and/or cadmium-containing stabilizers.

The foregoing detailed description and the following specific examples are for purposes of illustration only, and are not intended as being limiting to the spirit or scope of the appended claims.

EXAMPLE I

This example illustrates the use of certain stabilizing agents for stabilizing polyvinyl chloride against the deleterious effects of ultraviolet light.

The ingredients of the basic recipe used in this example contained 70 parts by weight of polyvinyl chloride, 30 parts by weight of dioctylphthalate as a plasticizer, and 1.4 parts by weight of a commercial liquid barium-cadmium stabilizer (Nuostabe V-134). One of the ultraviolet absorbers listed in Table I was added to the above ingredients in an amount of 1 part by weight.

The mixtures prepared from the above ingredients were passed through a rolling mill for 10 minutes at 160° C. to form a series of thin films or sheets therefrom. The resulting films or sheets were identical in all respects with the exception of the type of stabilizer that was employed.

Sample portions of the films were taken, and the samples were exposed to ultraviolet radiation in an Atlas Fade-O-Meter, Type 18F. The samples were exposed to ultraviolet radiation in the Fade-O-Meter under identical conditions until discolored. The number of hours of exposure required to discolor each sample was observed and recorded.

Run No. 1 was a control run in which no ultra-violet absorber was added to the basic recipe. The ultra-violet absorbers used in Runs 2, 3 and 4 were in accordance with the present invention. Runs No. 5 and 6 were made with prior art absorbers to provide comparative data.

The data thus obtained are recorded below in Table I.

TABLE I

| Run No. | Ultraviolet light absorber | Hours of exposure until discolored |
|---|---|---|
| 1 | No ultraviolet absorber (control run) | 600 |
| 2 | Tetra ethyl ester of dimethoxybenzylidenebis(malonic acid) | 1,800 |
| 3 | Tetramethyl ester of benzylidene bis (malonic acid) | 1,200 |
| 4 | Tetramehtyl ester of p-methoxybenzylidenebis(malonic acid) | 1,200 |
| 5 | Salicylalacetylacetone | 700 |
| 6 | 1,1,3,3,5,5-hexacarbethoxyheptane | 800 |

Upon reference to the data in Table I, it may be seen that Runs 2, 3 and 4, which contained a stabilizer in accordance with the present invention, required 1200–1800 hours of exposure in the Fade-O-Meter before discoloration occurred. However, discoloration occurred after only 600 hours of exposure in Run No. 1, which did not contain an ultraviolet absorber, and after only 700–800 hours in Runs No. 5 and 6, in which prior art stabilizers were employed. It is therefore apparent from these comparative data that the stabilizers of the present invention are remarkably effective, and produce much better results than chemically related prior art stabilizers.

EXAMPLE II

This example illustrates the use of certain ultraviolet light absorbers for the stabilization of an acrylic resin-based lacquer composition.

The basic lacquer composition contained on a weight basis 70 parts of a 40 percent solution in mineral spirits of polybutylmethacrylate (sold under the trade name Plexisol P-530). 5 parts of chlorinated terphenyl resin, and 25 parts of xylol. To 75 parts by weight of the above lacquer composition was added 25 parts by weight of pigment, which was a formaldehyde aromatic polyamine copolymer colored with a fluorescent dye (sold under the trade name Sicolux R-9), and 1.2 parts by weight of one of the ultraviolet light absorbers to be tested which are listed in Table II.

The series of acrylic resin lacquers prepared from the above ingredients were applied to metal sheets to provide specimens for testing. The metal sheets having dried acrylic resin lacquer films thereon were introduced into an Atlas Fade-O-Meter, Type 18F, and exposed to ultraviolet radiation under identical conditions until the films had discolored. The specimens were observed, and the time of exposure that was required for the films to discolor was recorded for each specimen.

The data thus obtained appear below in Table II.

TABLE II

| Run No. | Ultraviolet light absorber | Hours of exposure until discolored |
|---|---|---|
| 1 | No ultraviolet absorber (control run) | 300 |
| 2 | Tetramethyl ester of dimethoxybenzylidinebis(malonic acid) | 600 |
| 3 | Tetramethyl ester of benzylidene bis(malonic acid) | 500 |
| 4 | Salicylalacetylacetone | 300 |

Upon reference to the data appearing in Table II, it may be seen that the specimens for Runs 2 and 3, which contained an ultraviolet absorber in accordance with the invention, required 500–600 hours of exposure in the Fade-O-Meter before discoloration occurred. The specimen for Run No. 1, which did not contain an ultraviolet absorber, and the specimen for Run No. 4 which was made with a prior art stabilizer, discolored after only 300 hours of exposure. Thus, the stabilizers of the present invention are far more effective than the prior art ultraviolet light stabilizers in acrylic resin lacquers.

EXAMPLE III

This example illustrates the stabilization of polyethylene against the deleterious effects of ultraviolet light using the ultraviolet absorbers of the present invention.

A series of compositions containing 100 parts by weight of polyethylene and 1 part by weight of an ultraviolet stabilizer selected from Table III were prepared, and the compositions were mixed on a mill for 10 minutes at a temperature of 120° C. Test sheets were pressed from each of the compositions at a pressure of 50 atmospheres and a temperature of 160° C., and sample portions thereof were taken and subjected to ultraviolet light in an Atlas Fade-O-Meter, Type 18F.

The resulting series of test samples were exposed to ultraviolet light under identical conditions until discolored. The time required for discoloration of each sample was observed and recorded. The data thus obtained appear below in Table III.

TABLE III

| Run No. | Ultraviolet light absorber | Hours of exposure until discolored |
|---|---|---|
| 1 | No ultraviolet absorber (Control run) | 900 |
| 2 | Tetramethyl ester of dimethoxybenzylidenebis(malonic acid) | 1,700 |
| 3 | Tteramethyl ester of benzylidene bis (malonic acid) | 1,700 |
| 4 | Salicylalacetylacetone | 1,000 |

It is apparent from the data in Table III that the test samples of Runs 2 and 3, which contained an ultraviolet absorber of the invention, gave greatly improved results.

What is claimed is:

1. An ultraviolet light stabilized polymer composition consisting essentially of between about 0.01 and 10 parts by weight of an ultraviolet light absorber for each 100 parts by weight of the composition, the composition comprising at least one organic polymer normally susceptible to ultraviolet light decomposition selected from the group consisting of homopolymerizates of halogenated ethylenically unsaturated compounds, interpolymerizates of at least two halogenated ethylenically unsaturated compounds, interpolymerizates of at least one halogenated ethylenically unsaturated compound and at least one ethylenically unsaturated halogen-free monomer which is interpolymerizable therewith, polyolefins, polyester resins, polyamide resins, epoxy resins and acrylate resins, and the ultraviolet light absorber consisting esesntially of at least one substance selected from compounds having the following general formulae:

(I) 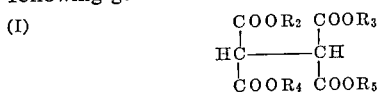

(II) 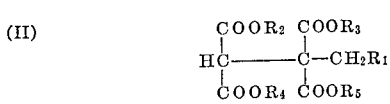

and (III) 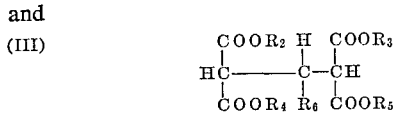

wherein $R_1$, $R_2$, $R_3$, $R_4$ and $R_5$ are monovalent substituents selected individually from the group consisting of alkyl, aryl, aralkyl, cycloalkyl, heterocyclic, and substituted alkyl, aryl, aralkyl, cycloalkyl and heterocyclic groups, and $R_6$ is a monovalent substituent selected from the group consisting of aryl, aralkyl, heterocyclic and substituted aryl, aralkyl, and heterocyclic groups.

2. The composition of claim 1 wherein the polymer comprises polyvinyl chloride.

3. The composition of claim 1 wherein the polymer comprises polyethylene.

4. The composition of claim 1 wherein the polymer comprises polypropylene.

5. The composition of claim 1 wherein the polymer comprises polystyrene.

6. The composition of claim 1 wherein the polymer comprises polybutylmethacrylate.

7. The polymer composition of claim 1 wherein the ultraviolet light absorber is selected from the group consisting of esters of 1,1,2,2-ethanetetracarboxylic acid, $C_6H_5$—CH—[CH—(COOCH$_3$)$_2$]$_2$ $CH_3O$—$C_6H_4$—CH—[CH—(COOCH$_3$)$_2$]$_2$ $NO_2$—$C_6H_4$—CH—[CH—(COOCH$_3$)$_2$]$_2$

CH—(COOCH$_3$)$_2$—C—(COOCH$_3$)$_2$—CH$_3$

CH—(COOCH$_3$)$_2$—C—(COOCH$_3$)$_2$—$C_2H_5$

CH—(COOCH$_3$)$_2$—C—(COOCH$_3$)$_2$—$C_4H_9$

CH—(COOCH$_3$)$_2$—C—(COOCH$_3$)$_2$—CH$_2$—CH=CH$_2$

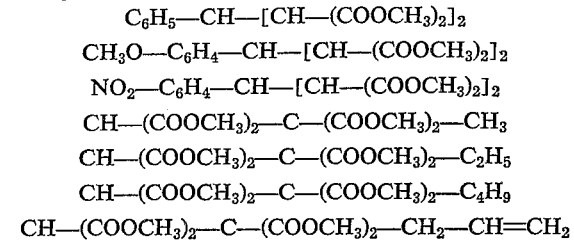

CH—(COOCH$_2$—$C_6H_5$)$_2$—C—(COOCH$_3$)$_2$—CH$_2$—$C_6H_5$ $NO_2$—$C_6H_4$—CH—[CH(COOC$_2$H$_5$)$_2$]$_2$ $C_3H_7$—CH—[CH—(COOCH$_3$)$_2$]$_2$ $C_6H_5$—CH—[CH—(COOC$_2$H$_5$)$_2$]$_2$ $(CH_3O)_2$—$C_6H_3$—CH—[CH—(COOCH$_3$)$_2$]$_2$ $C_6H_5$—CH—[CH—(COOC$_8$H$_{17}$)$_2$]$_2$ $C_6H_5$—CH—[CH—(COOCH$_2$—$C_6H_5$)$_2$]$_2$

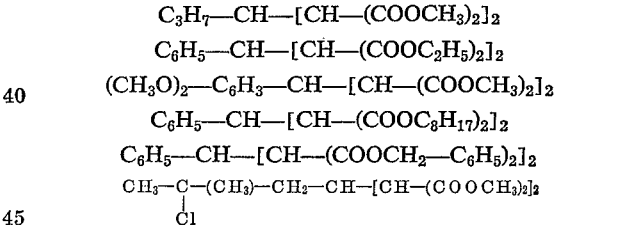

and

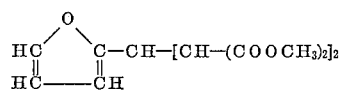

8. The polymer composition of claim 1 wherein the polymer composition comprises at least one polymer selected from the group consisting of polyvinyl chloride, copolymers of vinyl chloride and vinyl acetate, copolymers of vinyl chloride and vinylidene chloride, polyethylene, polypropylene, polystyrene and polybutylmethacrylate.

9. The polymer composition of claim 8 wherein the ultraviolet light stabilizer is selected from the group consisting of the tetramethyl esters of 1,1,2,2-ethanetetracarboxylic acid, dimethoxybenzylidene-bis(malonic acid), benzylidene-bis(malonic acid) and p-methoxybenzylidene-bis(malonic acid).

References Cited

UNITED STATES PATENTS 3,068,196  12/1962  Gordon _____ 260—45.85

DONALD E. CZAJA, Primary Examiner

V. P. HOKE, Assistant Examiner

U.S. Cl. X.R.

99—171; 260—45.8; 474—174

PO-1050
(5/69)

UNITED STATES PATENT OFFICE
CERTIFICATE OF CORRECTION

Patent No. 3,522,207               Dated July 28, 1970

Inventor(s) Dieter H. A. Hayer and Lore Grozinger

It is certified that error appears in the above-identified patent and that said Letters Patent are hereby corrected as shown below:

Column 5, line 1, change "satbilizer" to -- Stabilizer --

Column 5, line 19, change "rools" to -- rolls --

Column 6, Table I, Run No. 2, change "Tetra ethyl" to

-- Tetramethyl --

Column 6, Table I, Run No. 4, change "Tetramehtyl" to

-- Tetramethyl --

Column 6, Table I, Run No. 6, change "hexacarbethoxyheptane"

to -- hexacarbethoxypentane --

Column 6, Table II, Run No. 2, change "dimethoxybenzylidinebis"

to -- dimethoxybenzylidenebis --

Column 7, Table III, Run No. 3, change "Tteramethyl"

to -- Tetramethyl --

Column 7, line 51, change "esesntially" to -- essentially --

SIGNED AND
SEALED
NOV 10 1970

(SEAL)
Attest:

Edward M. Fletcher, Jr.
Attesting Officer

WILLIAM E. SCHUYLER, JR.
Commissioner of Patents